Dec. 14, 1948. A. H. LEWIS 2,456,432
FLASH TRIMMING MACHINE
Filed Jan. 31, 1944 3 Sheets-Sheet 3
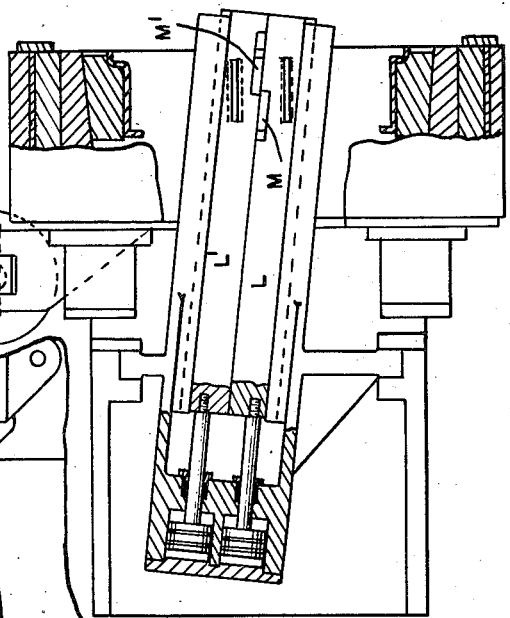
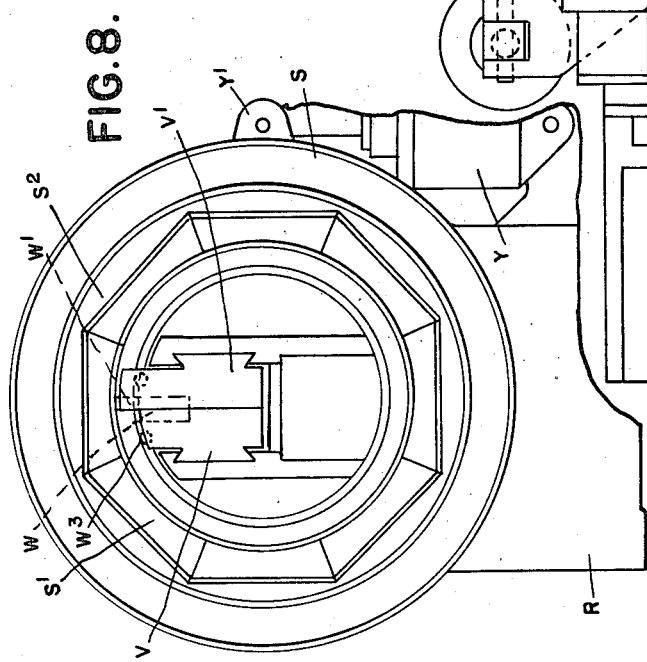
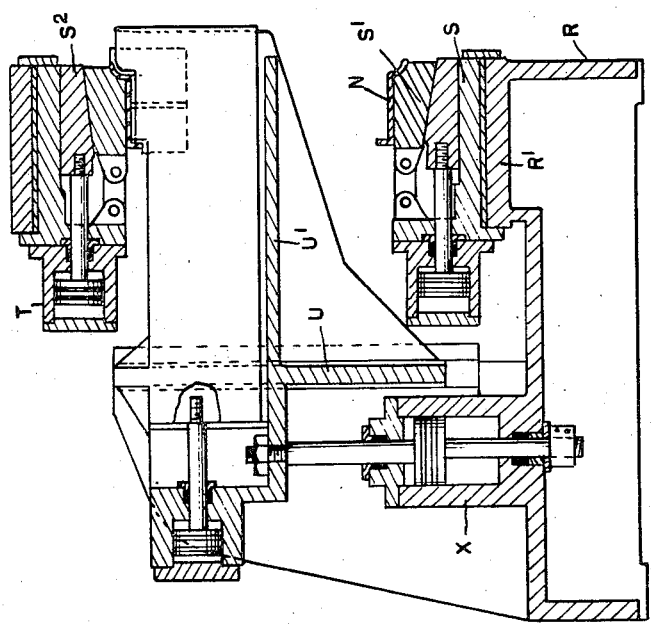
INVENTOR.
ALFRED H. LEWIS
BY
Whittemore Hulbert Belknap
ATTORNEYS Patented Dec. 14, 1948

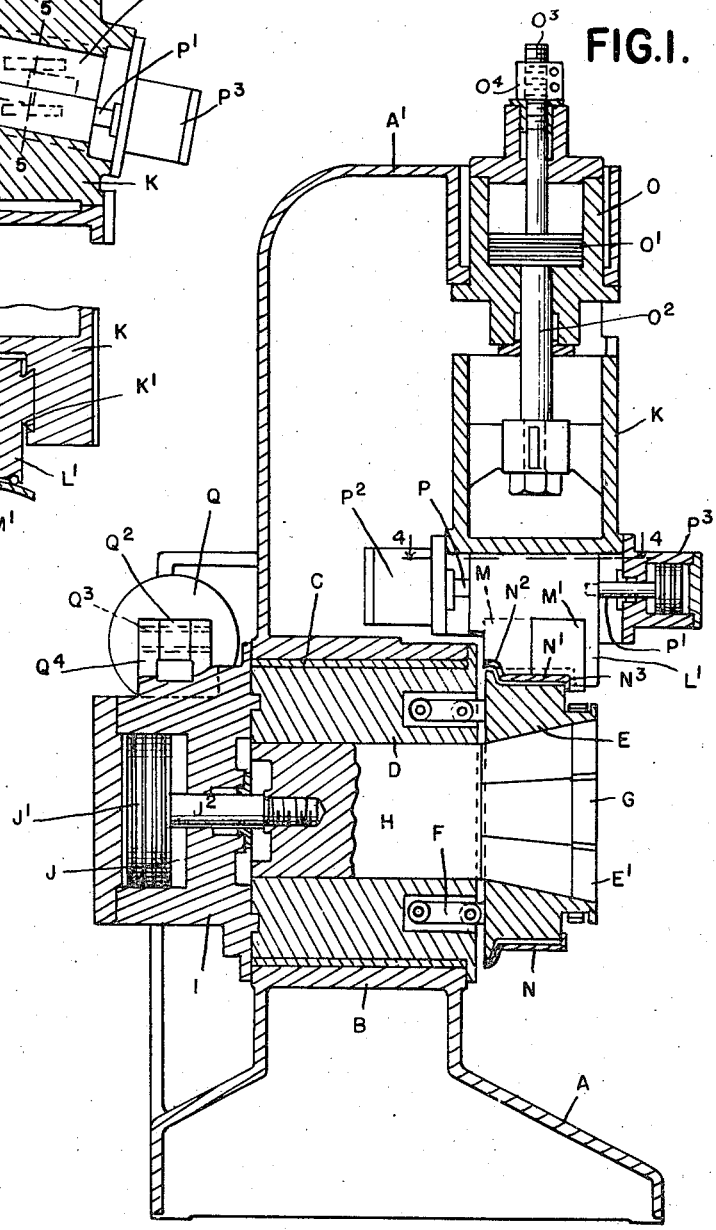

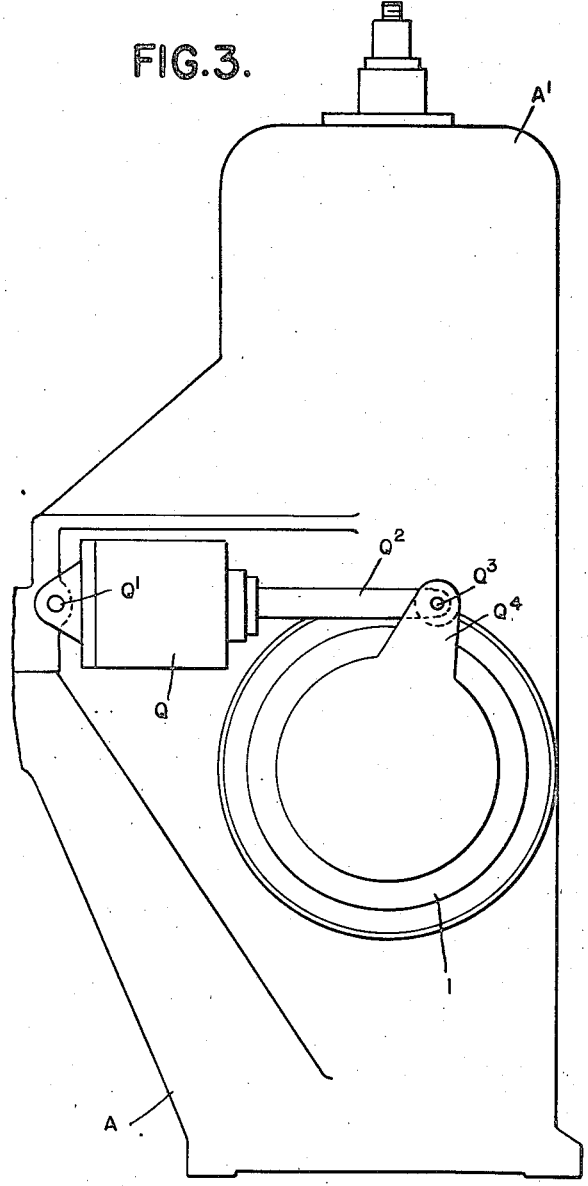
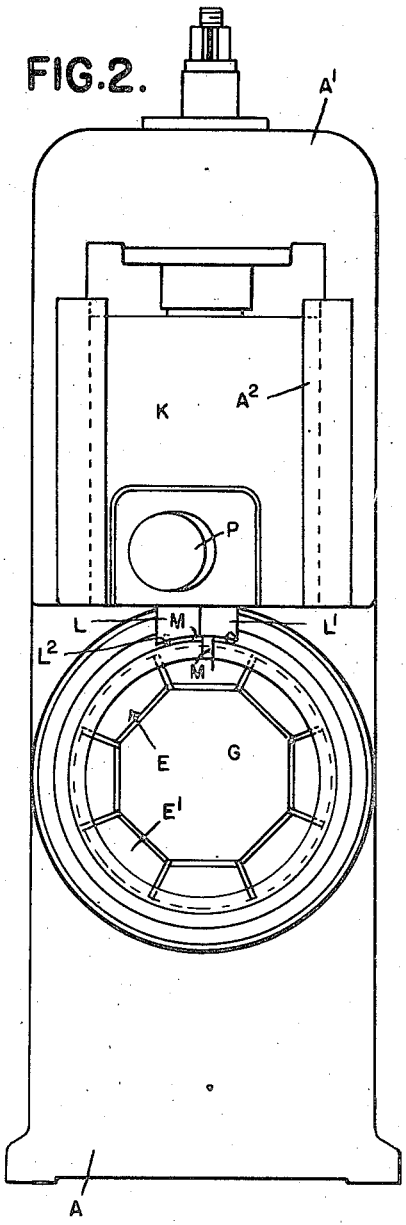

2,456,432

UNITED STATES PATENT OFFICE 2,456,432

FLASH TRIMMING MACHINE

Alfred H. Lewis, Huntington Woods, Mich., assignor to Swift Electric Welder Company, Detroit, Mich., a corporation of Michigan Application January 31, 1944, Serial No. 520,576

4 Claims. (Cl. 29—33)

The invention relates to flash trimming machines such, for instance, as are used for the removal of the flash from a weld.

It is the object of the invention to obtain a construction which will completely remove the flash without danger of cutting into any portion of the surface of the article. It is a further object to utilize the mechanism for removing the flash to accomplish the further function of sizing and circularizing the work and with these objects in view the invention consists in the construction as hereinafter set forth.

In the drawings:

Fig. 1 is a longitudinal central section through the machine;

Fig. 2 is a front elevation;

Fig. 3 is a rear elevation;

Fig. 4 is a horizontal section on line 4—4, Fig. 1;

Fig. 5 is a vertical section on line 5—5, Fig. 4;

Fig. 6 is a sectional plan view of a modification illustrating the shearing cutters; and Figs. 7 and 8 are, respectively, a central longitudinal section and an end elevation of a modified construction of machine.

Certain welded structures such, for instance, as tire receiving wheel rims have flash extending completely around the cross sectional contour. On the inner side of the rim the surface adjacent to the flash is concave whereas the outer surface is convex. There are also rim flanges around which the flash extends of a curved cross sectional contour. To completely remove this flash the shearing tool must conform to the cross sectional contour but there will be a certain amount of variation in the work so that one form of shearing blade will not fit all rims. I have, therefore, devised a construction in which the shearing blade is formed of a plurality of overlapping sections which are relatively movable into exact conformity to different portions of the contour. While it is possible to simultaneously remove the flash from both the inner and outer sides of the rim in a single machine, I have found it desirable to perform these two operations successively and in separate macines. This facilitates not only the holding of the rim during the cutting operation but also the simultaneous circularizing of the same.

In detail, A is a frame which is provided with an annular portion B in which is a bearing bushing C for an oscillatory cylindrical head D. Mounted at one end of the head D is a circularizing chuck E for engaging a wheel rim. This chuck may be arranged either inside or outside the rim but, as specifically shown in Figs. 1 to 3, is on the inside and is composed of a series of segments E' connected by links F to the head D. The inner surfaces of the segments are inclined to engage a correspondingly inclined expanding head G which latter is axially movable with respect to the head D and has a cylindrical shank H slidable therein. On the rear side of the portion B is a head I having formed therein a hydraulic cylinder J and the piston J' in this cylinder is connected by a rod J² with the shank H. Thus, hydraulic pressure applied to the inside of the piston J' will actuate the shank H and head G to expand the jaws of the clamp E.

The frame A has a portion A' extending above the annular portion B forming spaced parallel guideways A² for a vertically movable head K. This head has guideways K' therein extending longitudinally in a horizontal plane and at a small angle to the axis of the head D. In the guideways K' are slides L and L' for carrying the overlapping shearing blades M and M'. The blade M is fashioned to a contour corresponding to a cylindrical portion N' of the rim N and also the flange portion N² thereof. The blade M' corresponds to the cylindrical portion N' and the opposite flange N³. Thus, if there is any variation in the work with respect to the distance between the flanges N² and N³, the blades M and M' are adjustable to compensate therefor. To hold the blades M and M' in contact with all portions of the external contour of the rim, I have provided resilient pressure means preferably hydraulic motors operating on low pressure. One of these hydraulic motors includes a cylinder O mounted on the upper end of the portion A' of the frame A with the piston O' of this motor connected by a rod O² with the head K. The rod O² also extends upward above the cylinder O and has a threaded portion O³ for engaging an adjustable stop O⁴ which limits the downward movement of the head K. The slides L and L' are connected by rods P and P' with pistons in hydraulic cylinders P² and P³ for respectively pressing the blades M and M' against the flanges N² and N³ of the rim. Thus, the combined action of the cylinders O, P² and P³ is to hold the blades M and M' against the contour of the rim surface.

The shearing blades M and M' being preferably arranged at an angle to the axis of the head D will be at a corresponding angle to the flash on the rim so that during the shearing operation they will move progressively along said flash. The shearing is accomplished by a slight rotation of the head D within the bushing C and this movement is obtained through a hydraulic cylinder Q pivotally connected at Q' to the rear of the frame A. The piston rod Q² is pivotally connected to a wrist pin Q³ which is mounted in ears Q⁴ on the head I which latter is connected through the head D to the rim chuck E.

*Operation*

The rim N is transferred directly from the welding machine onto the chuck E while in its collapsed position after which a movement of the head G under actuation of the piston J' will expand the chuck to engage the rim and circularize the same. The fluid pressure in the cylinder O will press the shearing blades M and M' in contact with the cylindrical portion of the rim and the pressure in the cylinders P² and P³ will hold same blades against the flanges N² and N³. Fluid is then admitted into the cylinder Q to rotate the clamped rim about its axis which will shear off the flash on the outer surface of the rim.

As shown in Fig. 6 the blades M and M' instead of contacting at one time with the full length of the flash will on account of the angle at which they are set, progressively shear the flange from one end to the other. However, this is not essential, as the trimming might be performed with blades parallel with the flash.

While the blades come in actual contact with the surface of the work, in order to trim the flash and form a continuation of said surface, it is desirable to avoid any danger of the trimming edge cutting below said surface. I therefore preferably provide the slides L and L' with contact ribs L² for bearing against the surface of the work and limiting inward movement of the cutting blades.

As above stated, I preferably provide separate machines for trimming the flash from the outside and from the inside of the annular work. As thus far described, the machine is designed to trim only the outside flash, but in the construction shown in Figs. 7 and 8 the machine is designed to trim the flash from the inside of the rim.

As illustrated, the frame R is provided with an annular portion R' for holding a revoluble chuck supporting member S. The chuck is formed of a series of segmental jaw members S' for engaging the external surface of the work such as the rim N. These jaw members are simultaneously moved radially inward to engage and circularize the rim, this being accomplished by a wedge ring S² which is actuated by hydraulic cylinders T. Vertically slidable in the frame R is a head U which has a horizontally projecting portion U' extending through the space within the rim. The portion U' is hollow and forms guideways for slides V and V' carrying shearing blades W and W'. These overlap each other and have their shearing edges fashioned to a contour corresponding to different portions of a cross sectional contour of the work. Hydraulic cylinder X moves the head U vertically to bring the blades in contact with the inner surface of the work, and stop ribs W³ limit any further movement of said blades. The chuck supporting member S is revolved through a small segment by the operation of a hydraulic cylinder Y connected with an arm Y' on said member S.

The operation of this modified construction is essentially the same as that of the construction first described. There is, however, this difference: that in the modified form the work is externally chucked and is circularized by radially inward pressure of the jaws, whereas in the first described construction the chuck engages the inside of the work. In both constructions the path of movement of the shearing blades is concentric with the common axis of the chuck and rim so that the surface produced by the trimming off of the flash is in alignment and a continuation of the surface adjacent thereto. Both machines are adjustable to different diameters and thicknesses of rims, as well as to variations in the width thereof.

In the manufacture of wheel rims and other like annular articles, it is necessary to perform a sizing operation which will compensate for any inequalities in the welded rims. My improved flash removing machine accomplishes this sizing and circularizing of the rim by the means employed for holding the work during the flash removing operation. Therefore, the need of a separate mechanism for sizing and circularizing the product is dispensed with. In brief, I perform the two operations in a single machine.

What I claim as my invention is:

1. A flash shearing machine comprising a frame, a rotary head mounted therein, an expansion chuck mounted at one end of said head and adapted to engage and circularize an annular work member to expose the outer flash bearing surface thereof, means for expanding said chuck, a fluid motor mounted on said head for operating said expanding means, a shearing cutter formed of a plurality of overlapping sections conforming to different portions of a cross contour of the exposed surface of the work, slides for holding the respective sections in contact with the work surface, a cross head mounted on said frame to be vertically adjustable with respect to the work and having guideways for said slides, fluid pressure means for moving said slides to hold said cutter sections in contact with the adjacent portions of the surface of the work, and fluid motor means for rotating said first mentioned head to effect the shearing of the flash by said cutter.

2. A flash trimming machine comprising a frame, a head revolubly mounted in said frame, a chuck on said head for engaging and circularizing the work with an exposed flash bearing surface, a shearing cutter formed of a plurality of overlapping sections relatively movable in a generally axial direction of and corresponding in contour to different portions of said surface, means mounted on said frame for floatingly positioning said cutter sections and pressing the same in one direction into contact with said surface, fluid pressure means for yieldably pressing each section in a transverse direction respectively towards the adjacent portion of said surface, means for rotating said head to shear the flash from the surface, and means on said cutter sections engaging a portion of said surface for restraining the shearing edges from penetrating beneath said surface during the shearing of the flash.

3. A flash trimming machine comprising a frame, a head revolubly mounted therein, an expanding chuck carried by said head and adapted to engage and circularize an annular work member having a flash projecting from its outer surface, fluid operating means mounted on said head for expanding said chuck into engagement with the work, a shearing cutter formed of a plurality of overlapping sections extending in a generally axial direction of and conforming to different portions of the contour of the work, slides for floatingly positioning the respective sections in contact with the corresponding portions of the work surface, fluid pressure means for yieldably pressing the respective sections in a transverse direction into contact with adjacent portions of the surface of the work, fluid motor means for rotating said head to effect shearing of the flash, and means on said cutter sections engaging a portion of said surface for restraining the shearing edges from penetrating beneath said surface during the shearing of the flash.

4. A flash trimming machine comprising a rotary head, a chuck mounted on and co-axial with said head adapted for holding and circularizing annular work having an exposed concentric flash bearing surface, a shearing cutter conforming to and contacting with the contour of said surface, and provided with means cooperating with said surface to prevent cutting by the shearing edge beneath the same, and means for relatively rotating said head and cutter to shear the flash and form a continuation of said surface.

ALFRED H. LEWIS.

REFERENCES CITED

The following references are of record in the file of this patent:

UNITED STATES PATENTS

| Number | Name | Date |
|---|---|---|
| 1,117,663 | Gressle | Nov. 17, 1914 |
| 1,339,816 | Fiddyment | May 11, 1920 |
| 1,457,579 | Kranz | June 5, 1923 |
| 1,518,283 | Theberath | Dec. 9, 1924 |
| 1,539,800 | Brainard | May 26, 1925 |
| 1,610,982 | Theberath | Dec. 14, 1926 |
| 1,756,918 | Tormyn | Apr. 29, 1930 |
| 1,766,214 | Booth | June 24, 1930 |
| 1,973,344 | Hanson | Sept. 11, 1934 |
| 1,975,939 | Grotnes | Oct. 9, 1934 |
| 2,314,656 | Morton | Mar. 23, 1943 |

FOREIGN PATENTS

| Number | Country | Date |
|---|---|---|
| 281,968 | Great Britain | Dec. 15, 1927 |

OTHER REFERENCES

Popular Mechanics Magazine, page 1050, of June 1931.